US012138769B2

(12) United States Patent
Kondratiuk et al.

(10) Patent No.: US 12,138,769 B2
(45) Date of Patent: Nov. 12, 2024

(54) MOBILE POWER TOOL AND METHOD

(71) Applicant: Hilti Aktiengesellschaft, Schaan (LI)

(72) Inventors: Jens Kondratiuk, Buchs (CH); Phillipp Lorenz, Munich (DE); Balasubramaniam Vengudusamy, Munich (DE); Stefan Seemeyer, Wolfratshausen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/038,790

(22) PCT Filed: Nov. 26, 2021

(86) PCT No.: PCT/EP2021/083139
§ 371 (c)(1),
(2) Date: May 25, 2023

(87) PCT Pub. No.: WO2022/122413
PCT Pub. Date: Jun. 16, 2022

(65) Prior Publication Data

US 2023/0405785 A1 Dec. 21, 2023

(30) Foreign Application Priority Data

Dec. 11, 2020 (EP) .................................... 20213304

(51) Int. Cl.
*B25F 5/00* (2006.01)
*C10M 107/34* (2006.01)
(Continued)

(52) U.S. Cl.
CPC ............. *B25F 5/00* (2013.01); *C10M 107/34* (2013.01); *C10M 173/02* (2013.01); *B25D 17/26* (2013.01);
(Continued)

(58) Field of Classification Search
CPC ...... B25F 5/00; C10M 173/02; C10M 107/34; C10M 2201/02; C10M 2209/1055;
(Continued)

(56) References Cited

U.S. PATENT DOCUMENTS 4,183,414 A * 1/1980 Tamai .................... B25D 17/26 222/88
5,927,910 A * 7/1999 Fix, Jr. .................... B23B 49/02 408/130
(Continued)

FOREIGN PATENT DOCUMENTS

DE 19934170 A1 1/2001
DE 202012100435 U1 5/2012
(Continued)

OTHER PUBLICATIONS

International Searching Authority, International Search Report and Written Opinion in International Application No. PCT/EP2021/083139, mailed Mar. 2, 2022.
(Continued)

*Primary Examiner* — Nathaniel C Chukwurah
(74) *Attorney, Agent, or Firm* — Leydig, Voit & Mayer, Ltd.

(57) ABSTRACT

A mobile power tool comprising a drive unit is disclosed. The drive unit has an aqueous lubricant and/or the drive unit is set up for operation with the aqueous lubricant, wherein, before the start of a running-in phase of the drive unit, a bond roughness sigma of two interacting contact surfaces of the drive unit is greater than 0.01 μm, preferably at least 0.1 μm.

20 Claims, 4 Drawing Sheets

(51) Int. Cl.

| | |
|---|---|
| ***C10M 173/02*** | (2006.01) |
| *B25D 17/26* | (2006.01) |
| *C10N 20/06* | (2006.01) |
| *C10N 30/02* | (2006.01) |
| *C10N 50/08* | (2006.01) |

(52) U.S. Cl.

CPC ... *B25D 2250/365* (2013.01); *C10M 2201/02* (2013.01); *C10M 2209/1055* (2013.01); *C10N 2020/06* (2013.01); *C10N 2030/02* (2013.01); *C10N 2050/08* (2013.01)

(58) Field of Classification Search

CPC .............. B25D 17/26; B25D 2250/365; C10N 2020/06; C10N 2030/02; C10N 2050/08

See application file for complete search history.

(56) References Cited

U.S. PATENT DOCUMENTS

| | | | | |
|---|---|---|---|---|
| 7,449,432 | B2 | 11/2008 | Lockwood et al. | |
| 8,186,689 | B2 | 5/2012 | Miyazawa et al. | |
| 2008/0075401 | A1* | 3/2008 | Dorner ...................... | B25F 5/02 384/478 |
| 2008/0242566 | A1 | 10/2008 | Lockwood et al. | |
| 2009/0277657 | A1* | 11/2009 | Berger .................... | F16N 29/02 173/171 |
| 2010/0102515 | A1 | 4/2010 | Miyazawa et al. | |
| 2012/0073846 | A1* | 3/2012 | Hirai ....................... | B25B 21/02 173/200 |
| 2013/0081840 | A1* | 4/2013 | Aoki ...................... | B25D 17/26 173/213 |
| 2014/0360743 | A1* | 12/2014 | Muuttonen ......... | F16H 57/0456 173/105 |

FOREIGN PATENT DOCUMENTS

| | | | |
|---|---|---|---|
| EP | 1070756 | A1 | 1/2001 |
| EP | 2180214 | A1 | 4/2010 |
| WO | WO 01/42672 | A1 | 6/2001 |
| WO | WO 2007/103497 | A2 | 9/2007 |
| WO | WO 2012/029191 | A1 | 3/2012 |

OTHER PUBLICATIONS

Hasslinger Andreas: “Hydro Lubricants: Ist Wasser im Schmierstoff die Zukunft?”, fluid.de, Oct. 15, 2017 (Oct. 15, 2017).

* cited by examiner

MOBILE POWER TOOL AND METHOD

CROSS-REFERENCE TO RELATED APPLICATIONS

This patent application is the U.S. National Stage of International Patent Application No. PCT/EP2021/083139, filed Nov. 26, 2021, which claims the benefit of European Patent Application No. 20213304.7, filed Dec. 11, 2020, which are each incorporated by reference.

The invention relates to a mobile power tool with a drive unit.

For reasons of climate protection, there is a need for particularly energy-efficient, generic mobile power tools.

The object of the present invention is therefore to offer a mobile power tool and a method that allow particularly energy-efficient and yet inexpensive use of a generic mobile power tool.

The object is achieved by a mobile power tool, in particular a hand-held power tool or a construction robot, for example for carrying out work in building construction and/or civil engineering, with a drive unit, the drive unit having an aqueous lubricant and/or the drive unit being set up for operation with the aqueous lubricant, wherein, before the start of a running-in phase of the drive unit, a bond roughness sigma of two interacting contact surfaces of the drive unit is greater than 0.01 μm.

The invention is therefore based on the surprising finding that friction and subsequent fatigue damage can be remedied specifically by using an aqueous lubricant, especially in the running-in phase of the drive unit, to achieve particularly high-quality smoothing of the contact surfaces when there is initially comparatively rough surface roughness. This makes use of the fact that the lubricating film resulting from the aqueous lubricant can be comparatively thin. In particular, the thickness of the resulting lubricating film can be of the order of magnitude of the bond roughness. During the running-in phase, boundary friction and/or mixed friction can therefore exist as friction states in the drive unit, in particular when the drive unit is in nominal operation. The wear produced by the operation of the drive unit can then lead to an automatic smoothing of the contact surfaces.

In particular in the case of a drive unit set up for operation with the aqueous lubricant, preferably at least one region of a surface, in particular an inner surface, of the drive unit that can come into contact with the aqueous lubricant may comprise a corrosion-resistant and/or an anti-corrosive material. The at least one region may in particular have a coating.

Such a corrosion-resistant material, for example for a region of a machine part of the drive unit, may for example comprise a martensitic, stainless steel, for example X17CrNi16-2, X15Cr13 and/or X39CrMo17-1. It may also comprise an aluminum alloy, for example AlSi12Cu1 (Fe), Al Si9Cu3 (Fe) and/or Al Si7Mg0.3, for example for a region of a housing part of the drive unit.

The coating may comprise an anodized coating, in particular a hard-anodized coating, for example for aluminum. As an alternative or in addition, for example for steels, it may also comprise a nickel coating, in particular a galvanic nickel coating, a nickel-phosphorus coating, in particular a chemical nickel-phosphorus coating, for steels and/or a coating obtained by nitrocarburizing and/or post-oxidation.

The bond roughness sigma can be understood as meaning the square mean of the surface roughnesses of the respectively interacting contact surfaces.

A relative lubricating film thickness can be understood as meaning the ratio between a lubricating film thickness and a surface roughness, in particular the bond roughness sigma. The lubricating film thickness may preferably relate to a central lubricating film thickness.

Before the start of the running-in phase, the relative lubricating film thickness may be less than one. In particular, before the start of the running-in phase, the lubricating film thickness may be thinner than the surface roughness, in particular the bond roughness sigma.

During the running-in phase and/or after the running-in phase, the relative lubricating film thickness may increase to values greater than one, for example to values of at least three. In other words, the lubricating film may be thicker, in particular considerably thicker, than the surface roughness, for example the bond roughness sigma.

An in-situ nano-polishing effect can in this way be achieved. During or after the running-in phase, the surface roughness may be significantly reduced. For example, the bond roughness sigma may be at least halved, for example reduced to a tenth.

The surface roughness may be able to be measured by means of the stylus method. The measurement may be carried out here in accordance with DIN EN ISO 4288. The surface parameters may be calculated in accordance with DIN EN ISO 4287. Various surface parameters may be used to calculate the bond roughness sigma; the root mean square value of profile ordinates Rq is preferably used for determining the bond roughness sigma. The bond roughness sigma can be understood in particular as meaning the square root of the sum of the squared root mean square values of the profile ordinates Rq of the interacting contact surfaces.

The aqueous lubricant can also provide adequate scuffing load-carrying capacity, for example measured on an FZG gear wheel tension test stand.

The thickness of the lubricating film may be able to be measured with an elastohydrodynamics (EHD) test stand, available for example from PCS Instruments, Great Britain. For this purpose, the lubricant may be checked by measuring the lubricating film thickness in a contact region, in particular a point contact. In particular, a steel ball may be loaded against a glass pane, preferably coated with a chrome layer and an $SiO_2$ layer. The measurement may be based on optical interferometry. In particular, the contact region may be able to be illuminated with white light which is directed onto the contact through a microscope and a glass pane. Part of the light may be reflected by the chrome layer. Part of the light may penetrate the $SiO_2$ layer and the lubricating film and be reflected by the steel ball. The light paths of the two parts of the light may be brought together, so that an interference image can be generated. The interference image may be able to be directed into a spectrometer and/or an image recording device, for example a high-resolution black-and-white CCD camera, for recording an interference image. The interference image may be able to be analyzed by means of evaluation software. In particular, the lubricating film thickness may be determined and/or able to be determined by image analysis of the interference image.

These examinations may be carried out for example under the following conditions:

A loading may be chosen between 30 N and 50 N. The temperature of the lubricant and/or the remaining material may be between 35° C. and 45° C., in particular 40° C. A rotational speed of the glass pane may be set in such a way as to obtain a relative speed between 0.1 m/s and 3.5 m/s. A surface roughness Ra of the steel ball may be $10^1$ nm, in particular 10 nm. A surface roughness Ra of the glass pane may also be $10^1$ nm, in particular nm. The surface roughnesses Ra may preferably be mean roughness values.

Before the start of the running-in phase, the bond roughness sigma is more than 0.01 μm. For example, it may lie in the range from 0.1 μm to 1 μm.

After the running-in phase, the bond roughness sigma may be for example less than or equal to 0.01 μm.

Consequently, with the mobile power tool according to the invention, it is not necessary to smooth the interacting contact surfaces with a particularly high quality during the manufacture of the drive unit, for example by means of complex and therefore costly hard machining processes, for example vibratory grinding, honing or lapping. Manufacturing costs can in this way be saved.

In the course of the operation of the mobile power tool, in particular during the running-in phase, the very low surface roughness that forms can result in very low friction losses, so that the mobile power tool can be operated in a particularly energy-efficient manner.

The drive unit has the aqueous lubricant and/or is set up to operate with the aqueous lubricant. For this purpose, water-resistant and/or water-vapor-resistant materials may preferably be used in the drive unit. In particular, at least one seal of the drive unit may be formed from a water-resistant and/or water-vapor-resistant material. The drive unit may also have at least one dynamic seal, for example a labyrinth seal and/or a centrifugal seal.

The mobile power tool may be a hand-held power tool, for example a drill, a chiseling machine, a grinding machine, a sawing machine or the like. It is also conceivable that the mobile power tool is a construction robot or comprises a construction robot. The mobile power tool may have a manipulator, in particular a multi-axis manipulator. The mobile power tool may have a drive device for driving a tool, for example a drill, a chisel, a suction device or the like.

The mobile power tool may be set up for processing concrete and/or metal. It may be designed for drilling, chiseling, sawing and/or grinding.

In general, the mobile power tool may be set up for carrying out work in building construction and/or civil engineering. It is conceivable that it is not set up for use in mining.

The mobile power tool may be portable; it may for example have a weight of less than 50 kg, in particular of less than 25 kg.

In particular if it is designed as a construction robot or comprises such a robot, the mobile power tool may also have a chassis and/or a flight platform. Specifically in the case of mobile power tools capable of flying, for example in the form of unmanned flying objects such as drones that can be moved autonomously or partially autonomously, the increase in energy efficiency that can be achieved according to the invention has a particularly favorable effect.

The bond roughness is preferably also limited before the start of the running-in phase in order to facilitate operation of the mobile power tool also at the beginning and during the running-in phase. For example, the bond roughness sigma before the start of the running-in phase of the drive unit may be at most 3 μm, preferably at most 1 μm.

The aqueous lubricant may be designed in such a way that the lubricating film thickness is between 10% and 80%, in particular between 30% and 60%, particularly preferably between 50% and 60%, of a non-aqueous or at least substantially non-aqueous polyglycol-based lubricant, preferably having a kinematic viscosity of 80 $mm^2/s$ at 40° C. (as a reference lubricant).

In the context of the invention, a "substantially non-aqueous lubricant" can be understood as meaning a lubricant which, preferably at least immediately after production, contains at most 1%, particularly preferably at most 0.2%, water.

Such a range of the lubricating film thickness can be expected to result in boundary friction and/or mixed friction, at least for some time and/or in some regions within the drive unit. Preferably, in particular in normal operation of the drive unit or the mobile power tool, the lubricating film thickness of the aqueous lubricant is thicker than a lubricating film thickness that results when using pure water as the lubricant.

The reference lubricant may be biodegradable, that is to say it may be an EAL lubricant (environmentally acceptable lubricant). The aqueous lubricant may also be biodegradable. It is alternatively conceivable that the reference lubricant is not biodegradable. This may be the case in particular if the reference lubricant is polyglycol-based.

The aqueous lubricant may comprise at least 5%, preferably at least 15%, particularly preferably between 30% and 35%, in particular 33%, water. In particular, the aqueous lubricant may have a substantial proportion of water. This is particularly noteworthy, since otherwise, with the oil-based lubricants customary in mobile power tools, it is usually recommended for them to be replaced after even only small amounts of water have entered.

The aqueous lubricant may comprise at most 90%, preferably at most 70%, water.

The lubricant may also contain at least one glycol, for example a polyglycol. For example, the lubricant may contain one or more polyglycols in a proportion of at least 30%, preferably at least 40%. The proportion may be a maximum of 60%. The polyglycol may be a polyalkylene glycol. In particular after water, the glycol or the glycols may form a second-largest proportion of the lubricant.

The aqueous lubricant may furthermore have at least one additive, in particular a wear-resistant additive, an anti-corrosive additive and/or an antimicrobial, in particular growth-inhibiting, additive. In particular, the aqueous lubricant may be set up to suppress the formation of bacteria, fungi and/or algae. The aqueous lubricant may therefore be designed to avoid the occurrence of biofilms. The anti-corrosive additive may in particular be and/or comprise a non-ferrous metal-deactivating additive. It is also conceivable that the aqueous lubricant has at least one additive which reduces the coefficient of friction, a solid lubricant, an additive which improves the viscosity index and/or an additive which lowers the freezing point. The aqueous lubricant may also comprise an additive which increases the scuffing load-carrying capacity.

In general, the aqueous lubricant may be a fully formulated lubricant.

A general reduction in friction can be achieved if the aqueous lubricant has a kinematic viscosity in the range of at most 320 $mm^2/s$ at 40° C. Preferably, the aqueous lubricant may also have a kinematic viscosity of at least 30 $mm^2/s$. In particular, it may have a higher, preferably considerably higher, kinematic viscosity than water.

Due to the water content of the aqueous lubricant, it is advantageous if the power tool, in particular the drive unit, is set up so that the internal temperature of the drive unit during operation of the mobile power tool at an ambient temperature of 20° C. is at most 80° C., preferably at most 60° C. This can be achieved for example by the power tool, in particular the drive unit, being limited in its input power when the stated maximum temperatures are reached. It is also conceivable to reduce the speeds of parts that are moved relative to one another, and consequently of interacting contact surfaces that are moved relative to one another, by means of structural-geometrical optimization, in order already in the structural design to limit the frictional heat that occurs in this way.

Another possibility of maintaining the stated maximum internal temperatures is to dimension and/or control a cooling system of the mobile power tool with a correspondingly high performance.

Preferably, the stated maximum internal temperatures cannot be reached even with continuous operation and under full load.

Particularly noteworthy here is the possibility that the power tool may be set up to limit the input power of the drive unit in such a way that the internal temperature of the drive unit during operation of the mobile power tool at an ambient temperature of 20° C. is at most 80° C., preferably at most 60° C. By limiting the internal temperature, the power loss occurring in the drive unit can be limited. The limitation may be such that the mechanical power output by the drive unit may remain the same, despite the reduced input power, or may even be increased, in particular due to a disproportionately reduced power loss compared to an unlimited input power.

It is also conceivable that the power tool, in particular the drive unit, has a solids filter, in particular a filter magnet, which is set up to remove particles, in particular abrasion, from the aqueous lubricant, whereby the service life of the aqueous lubricant can be extended considerably. In general, the mobile power tool, in particular the drive unit, may have a lubricant filter.

For this purpose, the aqueous lubricant may preferably be free of solids or at least substantially free of solids and/or formed without solid residues, at least before the start of the running-in phase.

In particular, before the start of the running-in phase, the aqueous lubricant may be free of nanoparticles or other friction particles. It can therefore be produced particularly inexpensively. It may also be biodegradable. It may in particular be biologically harmless. In this case, the lubricant filter may also be designed in a particularly simple manner, since particles contained in the originally solid-free, aqueous lubricant can be classified as contaminants and can accordingly be able to be removed by the lubricant filter. The separation between contaminants and lubricant can therefore take place by means of a simple separation of liquid versus solid material.

It is also conceivable that the aqueous lubricant contains nano-friction particles, in particular before the start of the running-in phase. This allows the nano-polishing effect to be further intensified, in particular at the start of the running-in phase. The nano-friction particles may be formed from at least one inorganic material and/or at least one organic material. They may be designed to dissolve and/or decompose in the course of the operation of the mobile power tool, for example during the running-in phase, so that the scope of the additional polishing effect can be limited.

In general, the aqueous lubricant may contain nanoparticles, in particular before the start of the running-in phase. The nanoparticles may be nano-friction particles or at least act as nano-friction particles. In general, the nanoparticles can cause a tribological effect in the drive unit.

The mobile power tool can particularly preferably be operated cordlessly. For this purpose, the mobile power tool may have an energy store, in particular a rechargeable energy store. The rechargeable energy store may be a rechargeable battery or a fuel cell. In the case of such mobile power tools that can be operated cordlessly, the achievable increase in efficiency can directly have a particularly positive effect on the ease of use for a user of the mobile power tool, for example in the form of longer running times and/or higher work rates.

The mobile power tool may also be set up to drive a diamond-containing tool. For example, the mobile power tool may be set up to saw, drill and/or grind by means of the diamond-containing tool. Specifically in areas of use in which such a diamond-containing tool is usually used, high work rates, and at the same time often long periods of use, are required. Consequently, the energy requirement in the case of work that is typical for diamond-containing tools is particularly high, so that the avoidance of power loss due to friction is particularly desirable.

The scope of the invention also covers a method for the energy-efficient operation of a mobile power tool according to the invention, wherein a drive unit of the mobile power tool in which, before the start of a running-in phase, a bond roughness sigma of two interacting contact surfaces of the drive unit is greater than 0.01 μm is lubricated with an aqueous lubricant, especially in the running-in phase.

The method according to the invention consequently allows the aqueous lubricant to form such a thin lubricating film that the two interacting contact surfaces are moved relative to one another in the area of boundary friction and/or mixed friction. Particles can become detached for example from the initially rough contact surfaces and act as friction particles. The interacting contact surfaces can in this way automatically smooth themselves during the running-in phase. This allows the friction to be reduced and the mobile power tool to be operated in a particularly energy-efficient manner without the interacting contact surfaces having to be subjected to a particularly high-quality, usually very expensive, surface treatment in advance, in particular during the manufacture of the mobile power tool.

The mobile power tool that is subjected to the method according to the invention, in particular its drive unit and the lubricant used in the drive unit, may have at least one of the features mentioned above in connection with the mobile power tool and its components.

Further features and advantages of the invention emerge from the following detailed description of exemplary embodiments of the invention, with reference to the figures of the drawing, which shows details essential to the invention, and from the claims. The features shown there are not necessarily to be understood as true to scale and are shown in such a way that the special features according to the invention can be made clearly visible. The various features can be implemented individually in their own right or collectively in any combination in variants of the invention.

In the schematic drawing, exemplary embodiments of the invention are shown and explained in more detail in the following description.

IN THE FIGURES

Figure 4A:
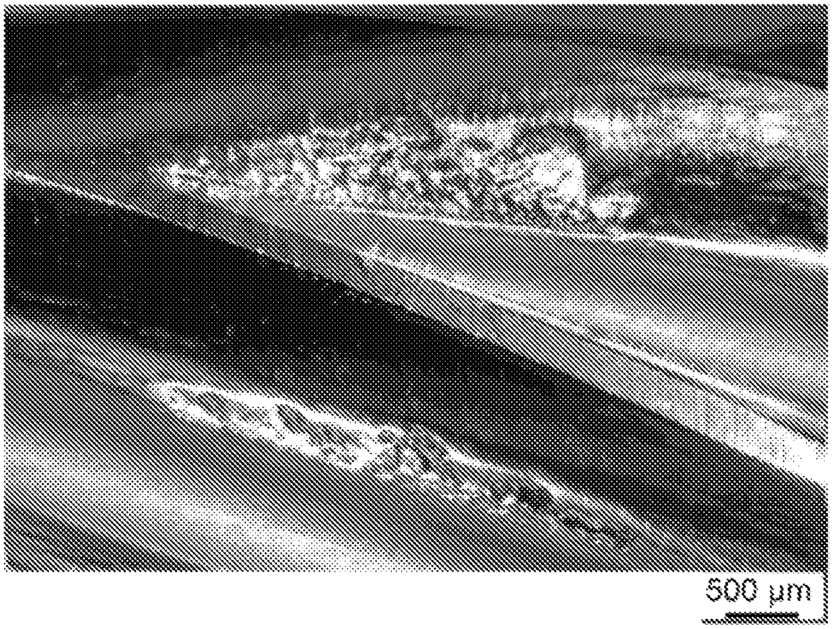
Figure 4B:
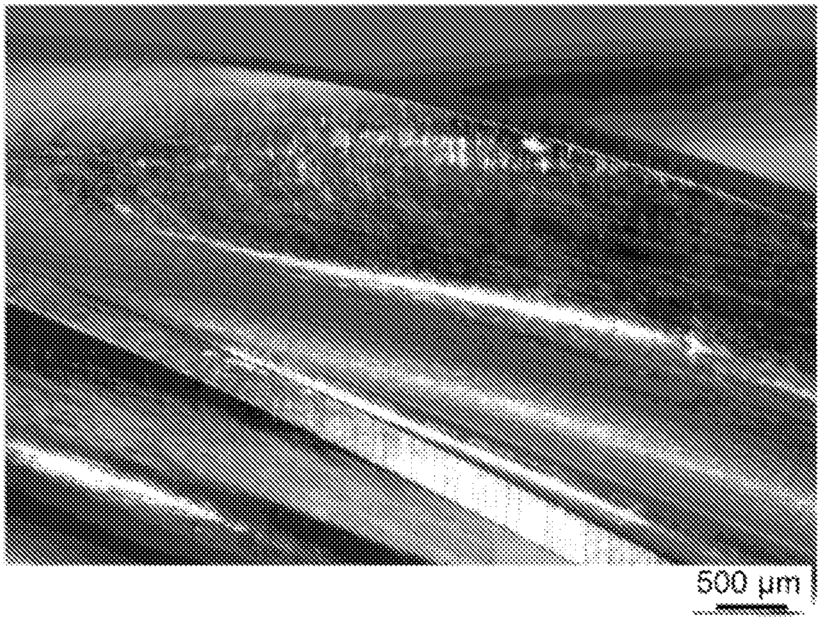

FIGS. 4*a* to 4*b* show micrographs of transmission parts and

Figure 5A:
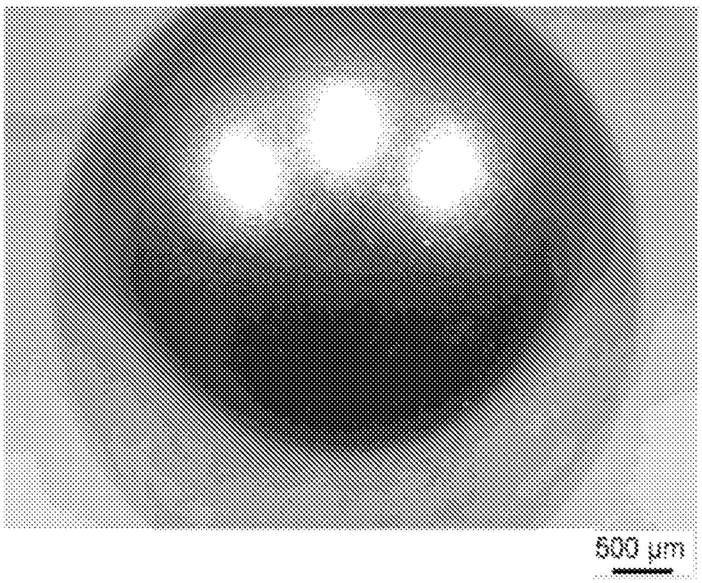
Figure 5B:
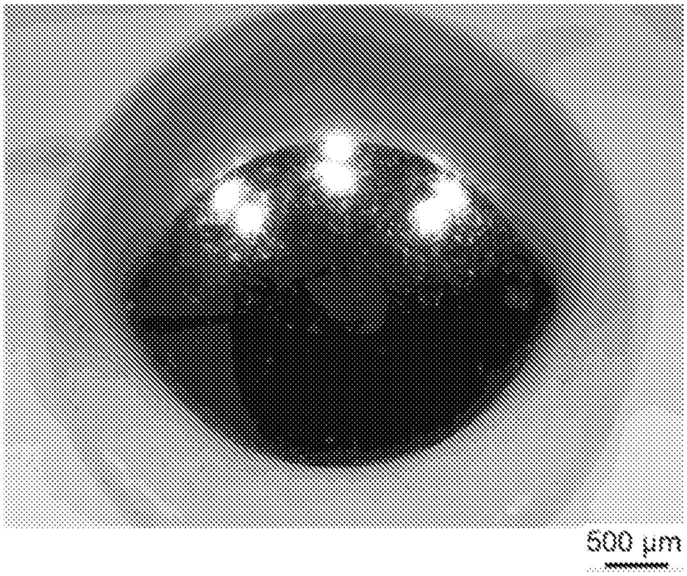

FIGS. 5*a* to 5*b* show micrographs of bearing balls.

In order to make it easier to understand the invention, the same reference signs are used in each case for identical or functionally corresponding elements in the following description of the figures.

Although the invention generally encompasses mobile power tools and therefore for example construction robots or hand-held power tools, the invention is explained using the example of a hand-held power tool, only to make it easier to understand.

Figure 1:
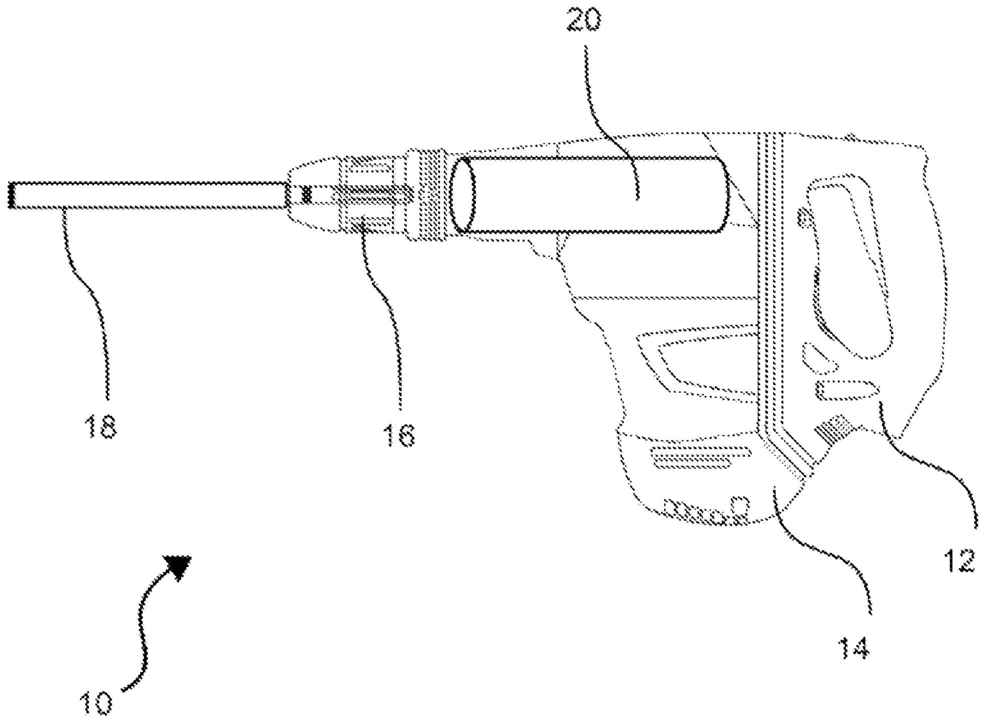
FIG. 1 shows a hand-held power tool.

FIG. 1 shows a mobile power tool in the form of a hand-held power tool 10. The hand-held power tool 10 is designed as a drill, in particular as a diamond drill. It is cordless. To this end, it has a rechargeable battery 14 in the region of a housing 12. The battery 14 comprises lithium. The hand-held power tool 10 is configured as a portable device. It has a weight of between 0.5 and 15 kg and generally of less than 25 kg.

The hand-held power tool 10 also has a tool fitting 16. A tool 18 is held in the tool fitting 16. The tool 18 is designed as a diamond drilling tool. It is therefore diamond-containing. It is alternatively or additionally conceivable that the mobile power tool is designed and/or can be used as a hammer drill and/or as a chiseling machine.

In a schematic representation, a drive unit 20 of the hand-held power tool 10 is also discernible in FIG. 1. The drive unit 20 is located inside the housing 12 and is shown in a manner superposed on the housing 12 only for reasons of illustration.

The drive unit 20 drives a shaft, to which in turn the tool fitting 16 is coupled.

The drive unit 20 has an electropneumatic impact mechanism and a rotary drive, which drive the shaft in a striking and rotating manner, respectively. The impact mechanism and the rotary drive are mechanically connected via a transmission of the drive unit 20 to an electric motor of the drive unit 20 and are able to be driven thereby.

The drive unit 20 has an aqueous lubricant by means of which transmission elements, for example gear wheels, of the drive unit 20 are lubricated. The drive unit 20 is designed to be water-vapor resistant. For this purpose, in particular all of the seals of the drive unit 20 that can come into contact with the aqueous lubricant are made from a water-vapor-resistant material. The water-vapor-resistant material may preferably be temperature-resistant, at least up to 120° C. In addition, the hand-held power tool 10 has a cooling system which is designed such that the internal temperature of the drive unit 20 during operation of the hand-held power tool 10 at an ambient temperature of 20° C. is at most 60° C.

Surfaces in the interior of the drive unit 20, in particular respectively interacting contact surfaces of paired gear wheels, are produced with a bond roughness sigma of at least 0.1 μm, and consequently have such a bond roughness before the start of a running-in phase.

Figure 2:
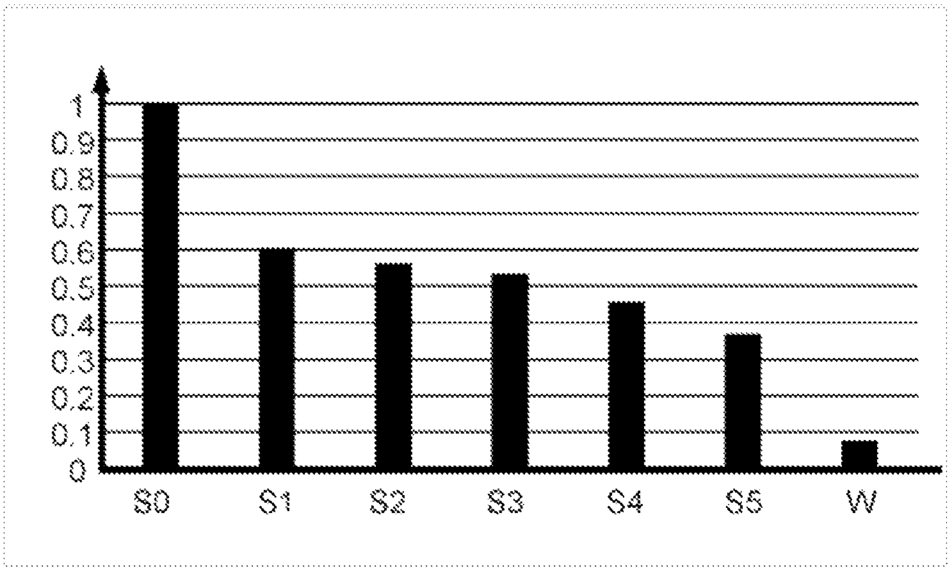
FIG. 2 shows a diagram of lubricating film thicknesses of different lubricants and FIGS. 3*a* to 3*c* show schematic representations of various frictional states.

FIG. 2 shows a diagram of lubricating film thicknesses of different lubricants, the lubricating film thicknesses being shown standardized to 100% for a substantially non-aqueous, polyglycol-based lubricant, identified in FIG. 2 as lubricant S0. The lubricant S0 has a kinematic viscosity of 80 $mm^2/s$ at 40° C.

Water W is also additionally shown schematically in the diagram for comparison.

Lubricants S1, S2, S3, S4 and S5 are aqueous lubricants which, according to the invention, can be used in the hand-held power tool 10 (FIG. 1). They have lubricating film thicknesses of between 30% and approx. 60% of the lubricating film thickness of the substantially non-aqueous lubricant S0 serving as a reference. The lubricants have a kinematic viscosity of 100 $mm^2/s$ at 40° C.

The lubricants S1, S2, S3, S4 and S5 each have a water content of between 30% and 35%. They also each contain at least between 40% and 60% polyglycols. Like the lubricant S0, they are fully formulated.

All of the aforementioned aqueous lubricants S1 to S5 contain further additives, in particular biocidal, anti-corrosive, wear-resistant, high-pressure and foam-controlling additives.

The aqueous lubricants S1 to S5 are formed without solid residues.

From the overall view of FIG. 2 it can be seen that the lubricants S1, S2, S3, S4 and S5 have reduced lubricating film thicknesses compared to the lubricant S0 serving as a reference, which however remain greater than that of the water W.

Figure 3A:
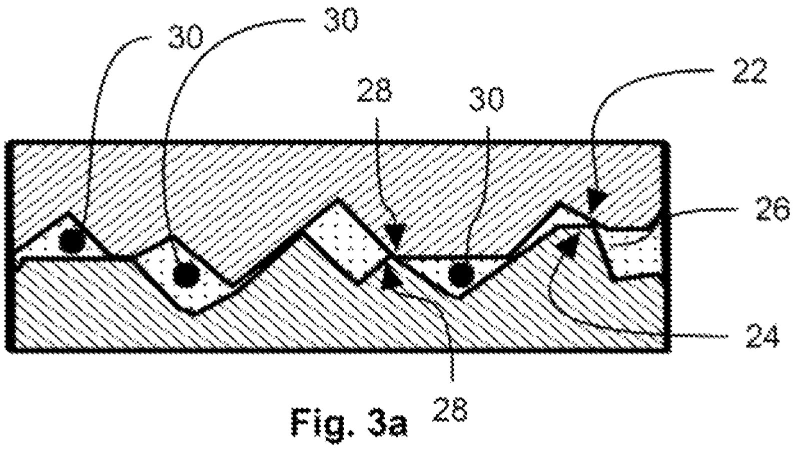
Figure 3B:
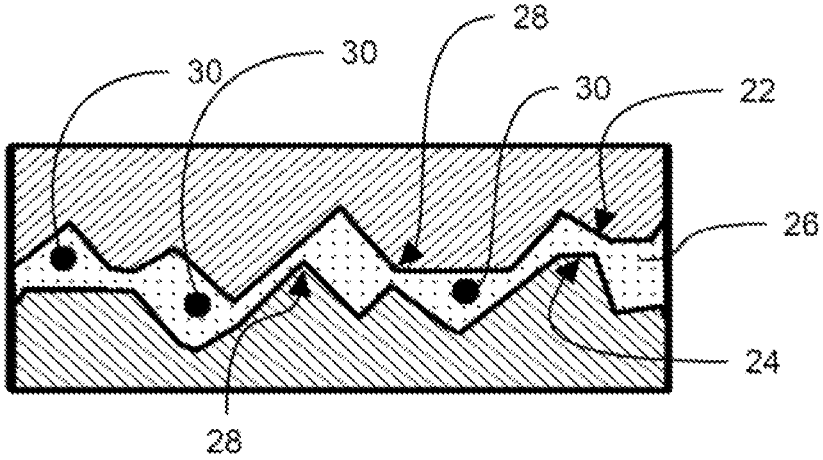
Figure 3C:
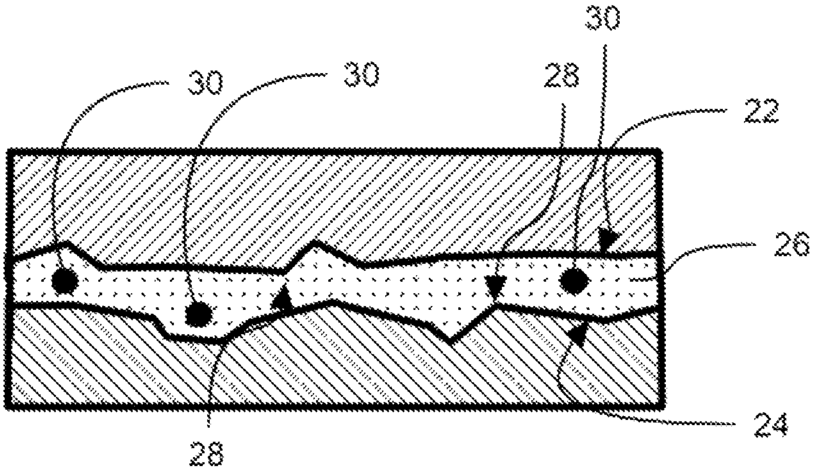

FIGS. 3*a* to 3*c* show in schematic representations different frictional states of the drive unit 20 (FIG. 1).

Two interacting contact surfaces 22, 24 are shown greatly enlarged as schematic sectional views. The contact surfaces 22, 24 may be for example regions of intermeshing gear wheels of the drive unit 20.

The surface shapings of the contact surfaces 22, 24 are not shown true to scale for reasons of illustration, in particular in order to show the waviness of the surfaces in a recognizable manner.

Depending on the frictional state, there is aqueous lubricant 26 with different film thicknesses between the contact surfaces 22, 24. The aqueous lubricant 26 may correspond to one of the lubricants S1, S2, S3, S4 or S5 (all FIG. 2).

In the state according to FIG. 3*a*, there is boundary friction. The bond roughness sigma of the contact surfaces 22, 24 is 0.1 μm, so that peaks 28, of which only individual ones are marked by way of example and provided with reference signs in FIGS. 3*a* to 3*c*, of the contact surfaces 22, 24 meet when the contact surfaces 22, 24 move relative to one another.

It can also be seen that the thickness of the lubricating film that forms is on average less than the bond roughness sigma. The relative lubricating film thickness is therefore less than 1, for example between 0.1 and 0.4, in particular between 0.1 and 0.2, at a test temperature of 40° C. and under a surface pressure of 1 GPa with 20% slip.

The state according to FIG. 3*a* corresponds to a state of the hand-held power tool 10 (FIG. 1) directly after its manufacture, i.e. before the start of a running-in phase.

According to the method according to the invention, it is envisaged to operate the hand-held power tool 10 during a running-in phase. The drive unit 20 is thereby lubricated by the lubricant 26 contained in the drive unit 20. For this purpose, the hand-held power tool may be operated for example over a period of 1 to 10 hours, for example 7 hours.

The boundary friction prevailing at least at the beginning of the running-in phase leads to the removal of particles from the contact surfaces 22, 24 and in this way to an automatic smoothing of the contact surfaces 22, 24. For this purpose, in FIGS. 3*a* to 3*c* individual particles 30 in the aqueous lubricant 26 are shown by way of example and provided with a reference sign.

FIG. 3*b* shows a frictional state in which there is mixed friction between the contact surfaces 22, 24.

Overall, the bond roughness sigma of the contact surfaces 22, 24 has already been reduced considerably, so that only a few individual peaks 28 of the contact surfaces 22, 24 can contact one another. The relative lubricating film thickness is in the range between 1 and 3.

This state corresponds to an advanced stage of the running-in phase.

FIG. 3*c* shows a frictional state in which there is pure fluid friction between the contact surfaces 22, 24. This state corresponds to a state of the drive unit 20 after the end of the running-in phase.

The bond roughness sigma of the contact surfaces 22, 24 has been further reduced considerably. The surface shaping of the contact surfaces 22, 24 is shown greatly exaggerated merely for reasons of illustration.

The relative lubricating film thickness has increased to greater than 3.

As a result of the automatically smoothed contact surfaces 22, 24, further operation of the hand-held power tool 10, and in particular of the drive unit 20, is therefore possible with considerably reduced friction.

FIGS. 4*a* and 4*b* show micrographs of regions of transmission parts after completion of an endurance test.

While FIG. 4*a* shows the result for a mobile power tool of which the drive unit is lubricated with the substantially non-aqueous lubricant S0 serving as a reference, the images according to FIG. 4*b* show the result for a mobile power tool of which the drive unit is correspondingly lubricated, according to the invention, with the aqueous lubricant S3.

In FIG. 4*a* there is considerable pitting, while FIG. 4*b* has remained almost free of pitting.

Also, FIG. 5*a* and FIG. 5*b* show micrographs of bearing balls after the endurance test has been carried out. By analogy with the two previous representations, the upper figure, FIG. 5*a*, shows the result for a drive unit where the substantially non-aqueous lubricant S0 has been used as the lubricant and the lower figure, FIG. 5*b*, shows the result for a drive unit in the case of which the aqueous lubricant S3 has been used.

It can be seen that the bearing ball of FIG. 5*b* has a significantly more pronounced clear metallic luster than the bearing ball of FIG. 5*a*, which is attributable to a significantly reduced surface roughness compared to the conventionally lubricated bearing ball.

It is particularly noteworthy here that the aqueous lubricant S3 is free of solids. In the tests associated with FIG. 5*b*, no nano-friction particles were added to the lubricant S3 either.

Furthermore, with the invention described above, it has been possible to achieve energy savings of up to 180 W of saved power loss, or approximately 8 percent of the mechanical transmission efficiency, in the case of a mobile power tool supplied with power from the grid.

Thanks to the significantly improved lubrication, it has also been possible to determine that the sump temperature of aqueous lubricants could be reduced by up to 8° C. or by up to approx. 13% while at the same time increasing the mechanical transmission output power by up to approx. 9% compared to the reference lubricant S0.

In contrast to the sump temperature of the reference lubricant S0, it has been possible to keep the sump temperatures of the aqueous lubricants below 60° C. even with an electrical input power of the power tool of 2.8 kW.

It has also proven to be particularly beneficial in terms of reducing the sump temperature if the aqueous lubricant has a viscosity of between 40 and 50 $mm^2/s$, in particular of 46 $mm^2/s$, at 40° C.

The invention claimed is:

1. A mobile power tool comprising a drive unit, wherein the drive unit has an aqueous lubricant and/or in that the drive unit is set up for operation with the aqueous, lubricant, wherein, before the start of a running-in phase of the drive unit, a bond roughness sigma of two interacting contact surfaces of the drive unit is greater than 0.01 μm.

2. The mobile power tool as claimed in claim 1, wherein the bond-roughness sigma before the start of the running-in phase of the drive unit is at most 3 μm.

3. The mobile power tool of claim 2, wherein the bond-roughness sigma before the start of the running-in phase of the drive unit is at most 1 μm.

4. The mobile power tool as claimed in claim 1, wherein the aqueous lubricant is designed in such a way that the lubricating film thickness is between 10% and 80% of a non-aqueous or at least substantially non-aqueous polyglycol-based lubricant.

5. The mobile power tool of claim 4, wherein the lubricating film thickness is between 30% and 60% of the non-aqueous or at least substantially non-aqueous polyglycol-based lubricant.

6. The mobile power tool as claimed in claim 1, wherein the aqueous lubricant comprises at least 5% water.

7. The mobile power tool of claim 6, wherein the aqueous lubricant comprises at least 15% water.

8. The mobile power tool as claimed in claim 1, wherein the aqueous lubricant comprises at most 90% water.

9. The mobile power tool of claim 8 wherein the aqueous lubricant comprises at most 70% water.

10. The mobile power tool as claimed in claim 1, wherein the aqueous lubricant has at least one additive.

11. The mobile power tool as claimed in claim 1, wherein the aqueous lubricant has a kinematic viscosity in the range of at most 320 $mm^2/s$ at 40° C.

12. The mobile power tool as claimed in claim 1, wherein the mobile power tool is set up so that internal temperature of the drive unit during operation of the mobile power tool at an ambient temperature of 20° C. is at most 80° C.

13. The mobile power tool as claimed in claim 1, wherein the mobile power tool is set up to limit input power of the drive unit in such a way that internal temperature of the drive unit during operation of the mobile power tool at an ambient temperature of 20° C. is at most 80° C.

14. The mobile power tool as claimed in claim 1, wherein the mobile power tool has a solids filter which is set up to remove particles from the aqueous lubricant.

15. The mobile power tool as claimed in claim 1, wherein the aqueous lubricant is free of solids or at least substantially free of solids and/or formed without solid residues, at least before the start of the running-in phase.

16. The mobile power tool as claimed in claim 1, wherein the aqueous lubricant contains nano-friction particles.

17. The mobile power tool as claimed in claim 1, wherein the mobile power tool can be operated cordlessly.

18. The mobile power tool as claimed in claim 1, wherein the mobile power tool is set up to drive a diamond-containing tool.

19. A method for the energy-efficient operation of the mobile power tool as claimed in claim 1, wherein the drive unit of the mobile power tool in which, before the start of a running-in phase, a bond roughness sigma of two interacting contact surfaces of the drive unit is greater than 0.01 μm is lubricated with an aqueous lubricant.

20. The mobile power tool of claim 1, wherein the bond-roughness sigma of two interacting contact surfaces of the drive unit is at least 0.1 μm.

* * * * *